United States Patent [19]
Tani et al.

[11] Patent Number: 4,569,331
[45] Date of Patent: Feb. 11, 1986

[54] SOLAR HEAT POWERED PLANT

[75] Inventors: Tatsuo Tani, Abiko; Sinji Sawata; Tadayoshi Tanaka; Koichi Sakuta, all of Ibaraki; Yuuji Nagata, Tokyo; Yasushi Eto, Tokyo; Makoto Adachi, Tokyo; Yasunori Matsurra, Tokyo, all of Japan

[73] Assignee: Tokyo Shibaura Denki Kabushiki Kaisha, Tokyo, Japan

[21] Appl. No.: 559,248

[22] Filed: Dec. 8, 1983

[30] Foreign Application Priority Data

Dec. 10, 1982 [JP] Japan .................. 57-216375

[51] Int. Cl.⁴ ............................. F24J 3/02
[52] U.S. Cl. .................... 126/435; 126/421; 126/437; 60/641.8; 60/641.15
[58] Field of Search .............. 126/437, 435, 419, 421, 126/422, 451, 417; 60/641.8, 641.13, 641.14, 641.15

[56] References Cited

U.S. PATENT DOCUMENTS

| | | | |
|---|---|---|---|
| 3,178,113 | 5/1962 | Curry | 126/437 |
| 4,212,287 | 7/1980 | Dougherty et al. | 126/435 |
| 4,265,223 | 5/1981 | Miserlis | 126/437 |
| 4,278,073 | 7/1981 | Canzano et al. | 126/437 |
| 4,388,916 | 6/1983 | Murdock | 126/437 |
| 4,404,957 | 9/1983 | Bayerle et al. | 126/422 |
| 4,413,614 | 11/1983 | Lyon et al. | 126/437 |
| 4,449,517 | 5/1984 | Tani et al. | 126/435 |

Primary Examiner—James C. Yeung
Attorney, Agent, or Firm—Oblon, Fisher, Spivak, McClelland & Maier

[57] ABSTRACT

In a solar heat powered plant according to the present invention, hot water is normally circulated through a hot-water tank, a low-temperature-side heat load unit, a return tank, a low-temperature-side heat exchanger, and again through the hot-water tank, in the order named, under the condition in which first and second valves are opened and closed, respectively. On the other hand, in warming up the hot-water tank, the first and second valves are closed and opened, respectively, so that the hot water is circulated between the hot-after tank and the low-temperature-side heat exchanger, through a by-pass pipe. Thus, the warming up of the hot-water tank can be achieved in a short time.

14 Claims, 4 Drawing Figures

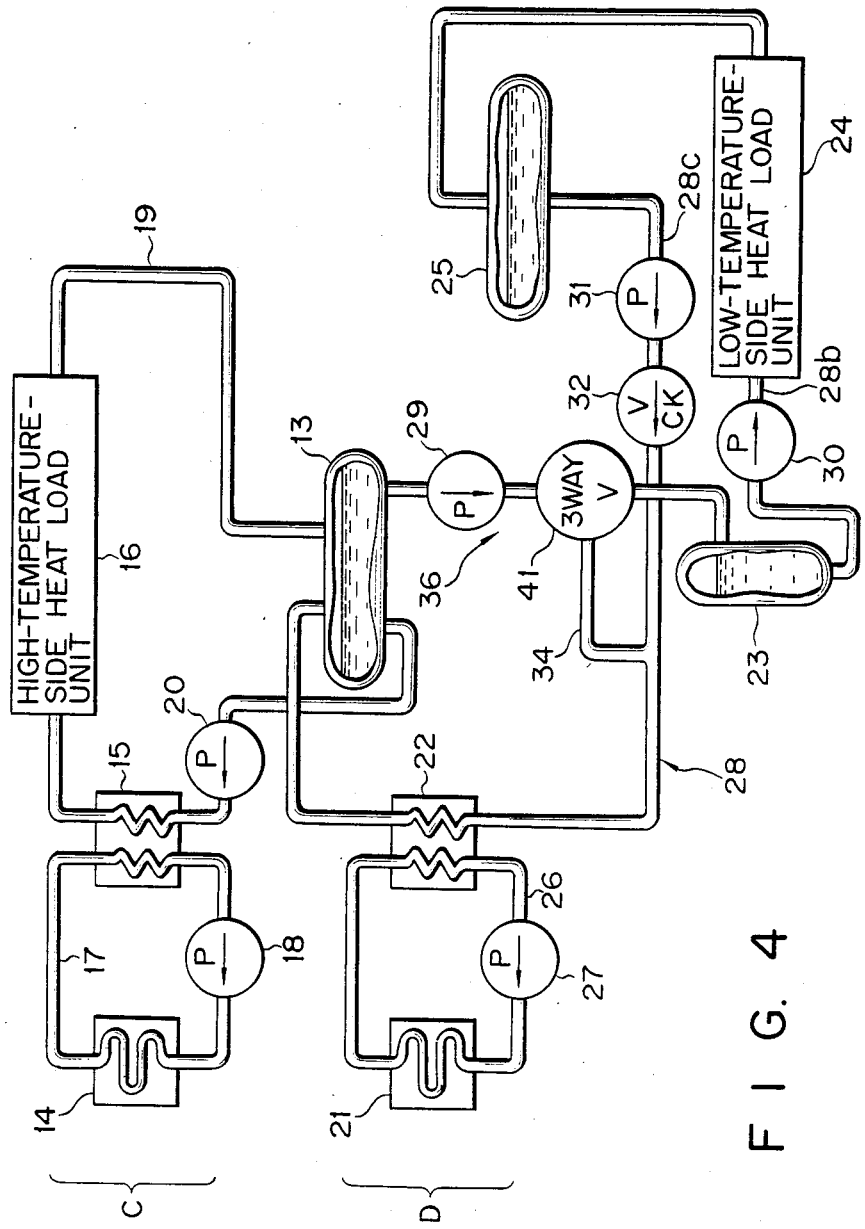
F I G. 4

4,569,331

SOLAR HEAT POWERED PLANT

BACKGROUND OF THE INVENTION

The present invention relates to a solar heat powered plant provided with a steam supply system, a hot-water supply system, and a hot-water tank for common use of both systems; and, more specifically, to an improvement of a solar heat powered plant in which water in a hot-water tank can be heated to a desired temperature in a short time and which can supply heat energy based on heat energy required.

FIG. 1 is a system diagram which schematically shows a heat-electric complex type solar heating system, as one example of a conventional solar heat powered plant. This solar heat powered plant is provided with a steam supply system A for feeding high-temperature steam to a high-temperature-side heat load unit, and a hot-water supply system B for feeding hot water to a low-temperature-side heat load unit.

As shown in FIG. 1, the prior art solar heat powered plant comprises: a hot-water tank 1 for storing hot water; a hot-water supply tank 2 for supplying hot-water; high and low-temperature-side heat load units 3A and 3B; a return tank 4 for temporarily storing low-temperature water from the low-temperature-side heat load unit 3B; and high and low-temperature-side heat exchangers 5A and 5B. The prior art solar heat powered plant further comprises high and low-temperature-side solar heat collectors 6A and 6B of a condenser type; pumps 7A, 7B, 8A, 8B, 9 and 10 attached to individual pipe lines; and a check valve 11 attached to a secondary-side inlet pipe 12 which extends from the return tank 4 to the low-temperature-side heat exchanger 5B.

In the hot-water supply system B, heat energy obtained through the solar heat collector 6B is supplied to the heat exchanger 5B, where hot water is produced from low-temperature water, via heat exchange. The hot water thus produced is stored in the hot-water tank 1. The hot water in the hot-water tank 1 is taken out as required and is fed into the hot-water supply tank 2, where it is further supplied to the low-temperature-side heat load unit 3B, such as a high-temperature-water supply unit or a heating system. Thereafter, the hot water is deprived of its heat energy by the load unit 3B, being reduced to low-temperature water, and is stored once in the return tank 4. Next, the low-temperature water is re-heated into hot water by the heat exchanger 5B, and the hot water thus re-heated is stored in the hot-water tank 1.

In the steam supply system A, the hot water from the hot-water tank 1 is further heated by the heat exchanger 5A, using heat energy obtained through the solar heat collector 6A. Thus, high-temperature steam is produced. The steam produced in this manner is supplied to the high-temperature-side heat load unit 3A such as steam power generation or industrial processing. Deprived of heat energy by the high-temperature-side load unit 3A, the high-temperature steam is converted into hot water, which is then returned to the hot-water tank 1.

Thus, according to the system in which high-temperature steam and hot water are fed to high and low-temperature-side heat load units 3A and 3B, respectively, using solar energy, the temperature of the hot water in the hot-water tank 1 must be fully raised to a desired temperature required to the high-temperature-side heat load unit 3A by the high-temperature side heat exchanger 5A, in order to produce high-temperature steam. This heating operation of the hot water is achieved by circulating water through the hot-water tank 1, the hot-water supply tank 2, the low-temperature-side heat load unit 3B, the return tank 4, the heat exchanger 5B; and, again, through the hot-water tank 1, in the order named, bringing the low-temperature-side heat load unit 3B to a no-load state.

Since the heating operation is usually performed during the morning hours, when solar radiation is faint, the amount of heat exchanged in the low-temperature-side heat exchanger 5B is not very great. Therefore, since the heating of the hot water in the hot-water tank 1 is time consuming, the start of the operation of the steam supply system A is liable to be delayed. Moreover, since the temperature within the hot-water tank 1 is lowered at night, after prolonged suspension of the operation, or after replacement of the circulating water, the heating operation tends to be time consuming for these reasons also.

SUMMARY OF THE INVENTION

The object of the present invention is to provide a solar heat powered plant which is capable of the fast heating of water in a hot-water tank, for the quick start of operations, in which hot water heated by a low-temperature-side heat exchanger using heat energy obtained through a low-temperature-side solar heat collector and stored in the hot-water tank is fed to a low-temperature-side heat load unit; the resultant low-temperature water is returned to the hot-water tank via the low-temperature-side heat exchanger; the hot water in the hot-water tank is heated by a high-temperature-side heat exchanger using heat energy obtained through a high-temperature-side solar heat collector, thereby producing steam; and the steam is fed to a high-temperature-side heat load unit.

In order to attain the above object, a solar heat powered plant according to the present invention is so designed that a hot-water tank and a low-temperature-side heat exchanger are connected by means of a by-pass pipe, whereby hot water is circulated between the hot-water tank and the heat exchanger when water in the hot-water is heated, thus reducing the heating time.

BRIEF DESCRIPTION OF THE DRAWINGS

FIG. 4 is a system diagram schematically showing a third embodiment of the solar heat powered plant shown in FIG. 2.

DETAILED DESCRIPTION OF THE PREFERRED EMBODIMENTS

Figure 1:
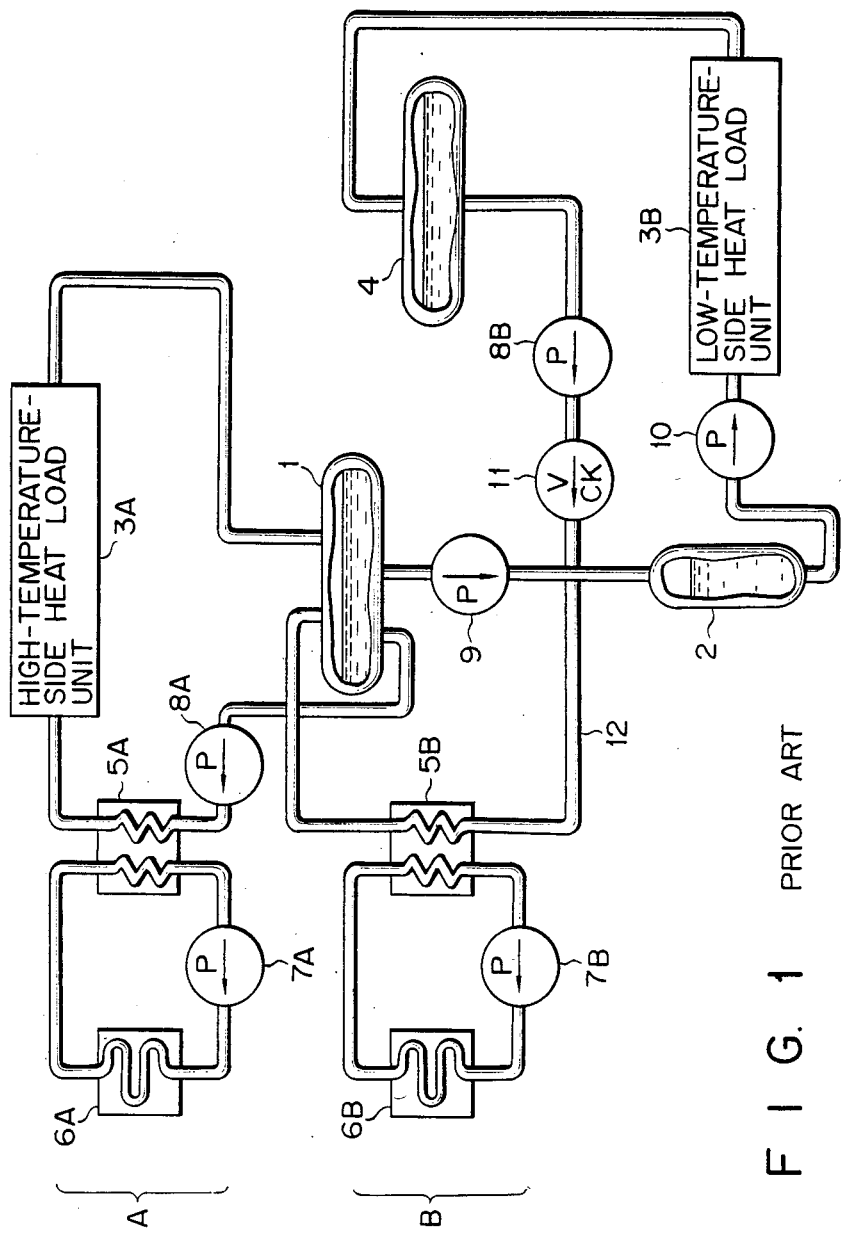
FIG. 1 is a system diagram schematically showing a prior art solar heat powered plant.
Figure 2:
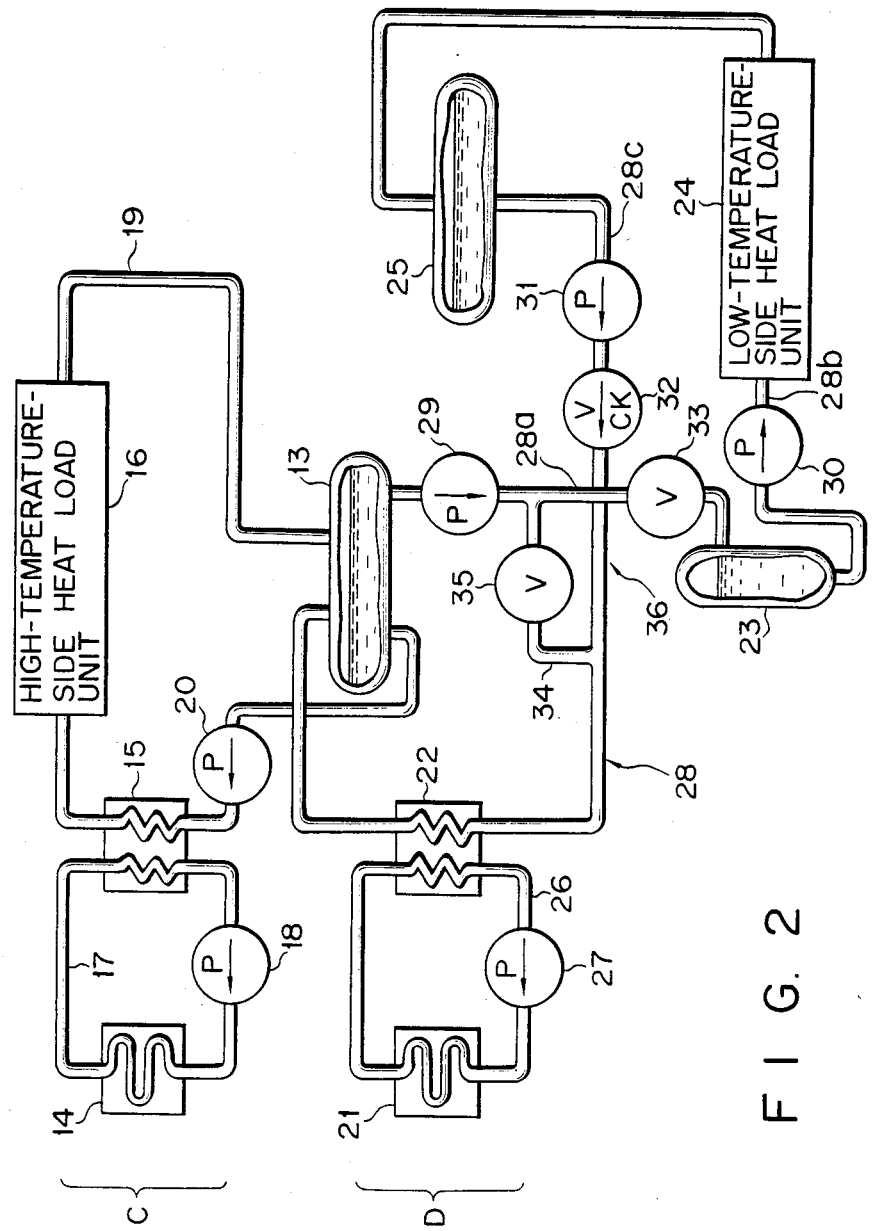
FIG. 2 is a system diagram schematically showing a first embodiment of a solar heat powered plant according to the present invention.

Referring now to FIG. 2, a first embodiment of a solar heat powered plant according to the present invention may now be described in greater detail.

As shown in FIG. 2, the solar heat powered plant comprises a steam supply system C, a hot-water supply system D, and a hot-water tank 13 for common use of both systems C and D.

The steam supply system C includes a high-temperature-side solar heat collector 14 of a condensor type, a high-temperature-side heat exchanger 15 and a high-temperature-side heat load unit 16. The high-temperature-side solar heat collector 14 condenses the sun's rays and collects their heat to provide a very high temperature. The solar heat collector 14 and the high-temperature-side heat exchanger 15 are connected by an endless primary pipe 17 on the high-temperature-side. The primary pipe 17 is fitted with a first pump 18 for circulating a heat medium within the pipe 17. Heat collected by the solar heat collector 14 is transmitted to the high-temperature-side heat exchanger 15 by the heat medium in the primary pipe 17 circulated by the first pump 18. The steam supply system C further includes a high-temperature-side secondary pipe 19 through which hot water in the hot-water tank 13 is circulated, via the high-temperature-side heat exchanger 15 and the high-temperature-side heat load unit 16, said hot water being finally returned to the hot-water tank 13. The secondary pipe 19 is fitted to a second pump 20 for circulating the hot water.

In the steam supply system C constructed in this manner, the hot water delivered from the hot-water tank 13 by the second pump 20 is given heat collected by the high-temperature-side solar heat collector 14, by heat exchange, in the high-temperature-side heat exchanger 15. Thus, the hot water is so heated as to become high-temperature steam. The high-temperature steam is fed to the high-temperature-side heat load unit 16, whereby it is supplied to the load side as steam for steam turbine power generation or industrial processing. Thus, the heat energy of the steam is consumed. As the high-temperature steam passes through the high-temperature-side heat load unit 16, therefore, it is reduced to hot water, which is re-stored in the hot-water tank 13.

The hot-water supply system D includes a low-temperature-side solar heat collector 21 of a condenser type, a low-temperature-side heat exchanger 22, a hot-water supply tank 23, a low-temperature-side heat load unit 24 and a return tank 25. The low-temperature-side solar heat collector 21 condenses the sun's rays and collects their heat to provide a relatively high temperature. The solar heat collector 21 and the low-temperature-side heat exchanger 22 are connected by an endless primary pipe 26 on the low-temperature-side. The primary pipe 26 is fitted with a third pump 27 for circulating a heat medium within the pipe 26. Heat collected by the solar heat collector 21 is transmitted to the low-temperature-side heat exchanger 22, by the heat medium in the primary pipe 26 which is circulated by the third pump 27.

The hot-water supply system D further includes a low-temperature-side secondary pipe 28, through which the hot water from the hot-water tank 13 is circulated via the hot-water supply tank 23, the low-temperature-side heat supply unit 24, the return tank 25 and the low-temperature-side heat exchanger 22; being finally returned to the hot-water tank 13. A fourth pump 29 for feeding the hot water in the hot-water tank 13 to the hot-water supply tank 23 is attached to that first section 28a of the secondary pipe 28 which is located between the two tanks 13 and 23. Also, a fifth pump 30 for feeding the hot water in the hot-water supply tank 23 to the low-temperature-side heat load unit 24 is attached to that second section 28b of the secondary pipe 28 which is located between the hot-water supply tank 23 and the low-temperature-side heat load unit 24. Furthermore, a sixth pump 31 for feeding low-temperature water in the return tank 25 through the low-temperature-side heat exchanger 22 to the hot-water tank 13 is attached to that third section 28c of the secondary pipe 28 which is located between the return tank 25 and the low-temperature-side heat exchanger 22. A check valve 32 for preventing counterflow is attached to that portion of the third section 28c of the secondary pipe 28 which lies between the sixth pump 31 and the low-temperature-side heat exchanger 22.

A first valve 33 for controlling hot water circulation is attached to that portion of the first section 28a of the secondary pipe 28 which lies between the fourth pump 29 and the hot-water supply tank 23. The first valve 33 may optionally be shifted by manual operation between a first position where the passage of the secondary pipe 28 is opened to allow the circulation of the hot water and a second position where the passage is closed to prevent the circulation of the hot water. A by-pass pipe 34 is connected between that portion of the first section 28a of the secondary pipe 28 which lies between the first valve 33 and the fourth pump 29, and that portion of the third section 28c of the secondary pipe 28 which lies between the check valve 32 and the low-temperature-side heat exchanger 22. The by-pass pipe 34 is fitted with a second valve 35 for controlling circulation of the hot water. The second valve 35 may be manually shifted between a third position, where the passage of the by-pass pipe 34 is opened to allow the circulation of the hot water; and a fourth position, where the passage is closed to prevent the circulation of the hot water. The first and second valves 33 and 35 constitute a selector valve means 36.

In the hot-water supply system D, the first and second valves 33 and 35 are in the first and fourth positions, respectively, when the solar heat powered plant is in the normal operation mode, i.e., when heat energy is enough to consumed in both the steam and hot-water supply systems C and D. In other words, in the normal operation mode, the by-pass pipe 34 and the low-temperature-side secondary pipe 28 are closed and opened, respectively, so that the hot water passes through all path of the low-temperature-side secondary pipe 28.

In this normal operation mode, the hot water in the hot-water tank 13 is fed, by the fourth pump 29, into the hot-water supply tank 23, where it is once stored. The hot water in the hot-water supply tank 23 is fed through the low-temperature-side heat load unit 24 into the return tank 25 by the fifth pump 30. As the hot water passes through the low-temperature-side heat load unit 24, a hot-water supply unit, heating system or the like as a load consumes the heat energy of the hot water to reduce it to low-temperature water. The low-temperature water in the return tank 25 is returned by the sixth pump 31 to the hot-water tank 13, through the low-temperature-side heat exchanger 22. As the low-temperature water passes through the low-temperature-side heat exchanger 22, it is heated by the heat obtained through the low-temperature-side solar heat collector 21, returning to its former hot-water state. Thus, the hot water is restored in the hot-water tank 13.

At the initial operation of the solar heat powered plant of the present invention, it is often necessary that the high-temperature-side heat load unit 16 be driven prior to the low-temperature-side heat load unit 24. In this case, the hot-water supply system D is used to raise the temperature of the water within the hot-water tank 13, thereby reducing the time required for raising the temperature. The operation of the low-temperature-side heat load unit 24 in the hot-water supply system D is first stopped, and the first and second valves 33 and 35 are set to the second and third positions, respectively. In other words, in a warming-up mode, the supply of the hot water from the hot-water tank 13 to the hot-water supply tank 23 is stopped, the by-pass pipe 34 gets ready for circulation, and the hot water in the hot-water tank 13 is fed through the bypass pipe 34 and the third section 28c of the secondary pipe 28 to the low-temperature-side heat exchanger 22, where the hot water is heated by heat exchange. The hot water heated in this manner is returned to the hot-water tank 13.

According to this arrangement, at a normal operation mode, the hot water is circulated through the hot-water tank 13, the low-temperature-side heat load unit 24, the return tank 25, the low-temperature-side heat exchanger 22; and, again, through the hot-water tank 13, in the order named, as in the conventional system, when the first and second valves 33 and 35 are opened and closed, respectively. On the other hand, in a warming up mode of the hot-water tank 13, the first and second valves 33 and 35 are closed and opened, respectively, so that the hot water (or low-temperature water) in the hot-water tank 13 is circulated between the hot-water tank 13 and the low-temperature-side heat exchanger 22, through the by-pass pipe 34. When the temperature of the hot water in the hot-water tank 13 reaches a set temperature or a temperature a little lower than the same, the first and second valves 33 and 35 are opened and closed, respectively, so that the normal operation mode is resumed.

The arrangement of the first embodiment described above produces the following effects. If the warming up of the hot-water tank 13 is performed by using the same circulation path as in the normal operation, most of the heat energy provided by the low-temperature-side heat exchanger 22 will be consumed by the hot-water supply tank 23, the heat supply unit 24, the return tank 25, and the secondary pipe 28 connecting these elements, so that the warming up operation will consume a lot of time. In the warming-up mode, however, the first and second valves 33 and 35 are closed and opened, respectively, to allow the hot water to circulate only between the hot-water tank 13 and the heat exchanger 22, so that the warming up of the hot-water tank 13 can be achieved in a short time. Additionally, the arrangement described above is very effective where there is a load requirement in which the high-temperature-side heat load unit 16 must be used prior to the low-temperature-side heat load unit 24.

It is to be understood that the present invention is not limited to the arrangement of the first embodiment described above, and that various changes and modifications may be effected therein by one skilled in the art, without departing from the scope or spirit of the invention.

Figure 3:
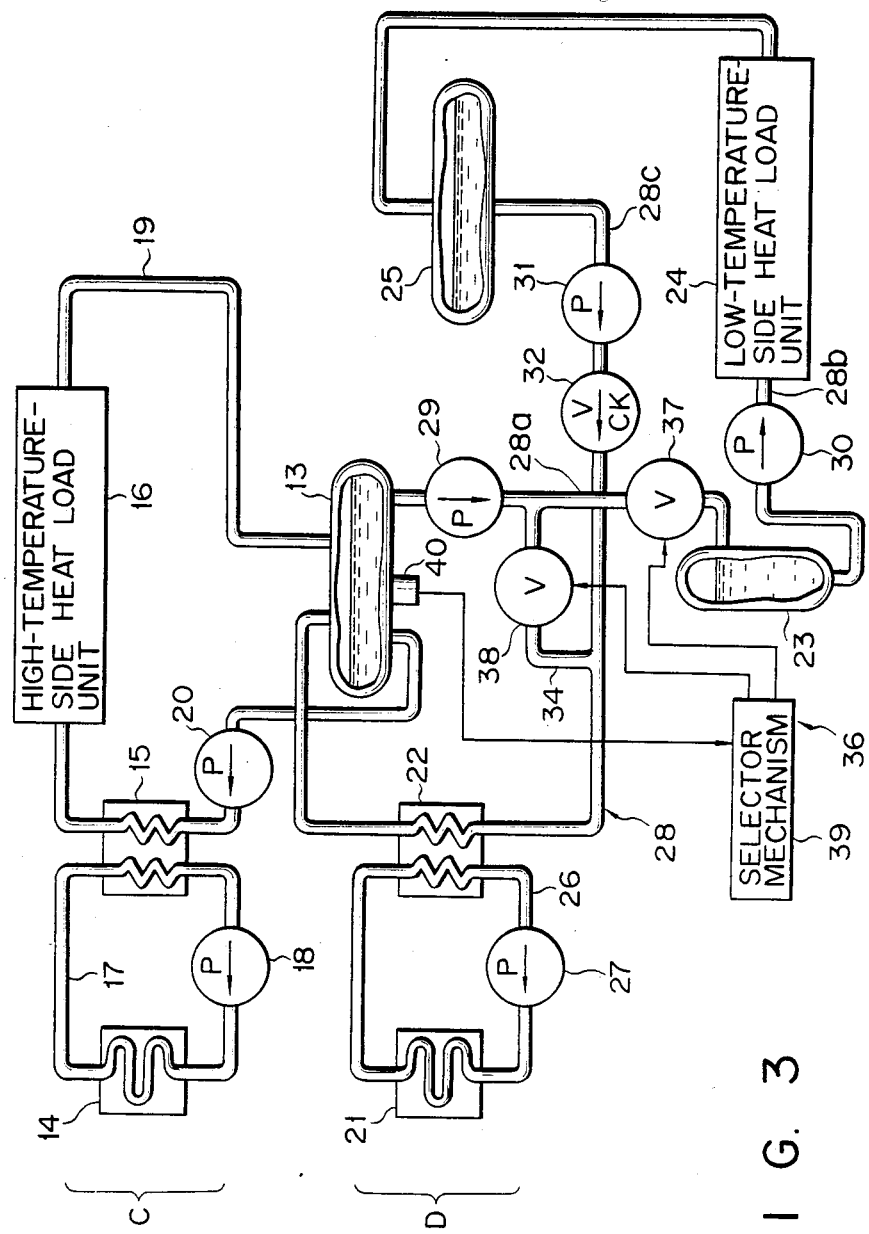
FIG. 3 is a system diagram schematically showing a second embodiment of the solar heat powered plant shown in FIG. 2.

Referring now to FIGS. 3 and 4, other embodiments of the present invention may be described as follows. In the description to follow, like reference numerals are used to designate members similar to those described in connection with the aforementioned embodiment.

In the foregoing first embodiment, the selector valve means 36 has been described as including the first and second valves 33 and 35 which can be operated manually. The present invention is not, however, limited to this arrangement. As shown in the second embodiment of FIG. 3, for example, the selector valve means 36 may include; first and second solenoid-operated switch valves 37 and 38 corresponding in position to the first and second valves 33 and 35, respectively, used in the aforementioned first embodiment; a selector mechanism 39 for switching the first and second solenoid-operated switch valves 37 and 38; and a detector 40 for detecting the temperature of the hot water in the hot-water tank 13 and delivering the results of that detection to the selector mechanism 39. In response to an instruction for the warming up of the hot-water tank 13, the selector mechanism 39 automatically closes and opens the first and second solenoid-operated switch valves 37 and 38, respectively. As the warming up advances, the hot water in the hot-water tank 13 is heated to a desired temperature in a short time. This is detected by the detector 40 and transmitted as an instruction to the selector mechanism 39. Receiving this instruction, the selector mechanism 39 automatically opens and closes the first and second solenoid-operated switch valves 37 and 38, respectively.

According to the second embodiment thus constructed, the solar heat powered plant is automatically switched from the warming-up mode to the normal operation mode.

In the aforementioned first embodiment, moreover, the selector valve means 36 has been described as including two valves 33 and 35. As shown by the third embodiment of FIG. 4, however, the selector valve means 36 may include a three-way valve 41 provided at the junction of the first section 28a of the low-temperature-side secondary pipe 28 and the by-pass pipe 34. The three-way valve 41 is so designed as to feed the hot water from the hot-water tank 13 selectively to the hot-water supply tank 23 or the low-temperature-side heat exchanger 22. The three-way valve 41 may be switched in response to an instruction from a selector mechanism which is connected to the detector 40, as shown in FIG. 3. The use of the selector valve means 36 of this construction simplifies the structure of the system.

Further, the valves 33 and 35 may be replaced with control valves for controlling the flow rate of hot water passing therethrough. By this replacement, the solar heat powered plant according to the present invention can warm up the hot-water tank 13 while supplying the heat energy to the low-temperature-side heat load unit 24.

According to the present invention, as described above, a selector valve mechanism allows hot water to circulate only between a hot-water tank and a low-temperature-side heat exchanger in the warming up mode, so that warming up of the hot water tank can be achieved in a short period of time, hastening the start of the operation.

What is claimed is:

1. A solar heat powered plant comprising:
    a low-temperature-side solar heat collector for collecting solar heat;
    a low-temperature-side heat exchanger for heating water by using low-temperature heat energy collected by the low-temperature-side solar heat collector, thereby producing hot water;
    a hot-water tank for storing the hot water heated by the low-temperature-side heat exchanger;
    a low-temperature-side heat load unit for consuming the heat energy of the hot water delivered from the hot-water tank, the water deprived of its heat energy by the low-temperature-side heat load unit being returned to the low-temperature-side heat exchanger;

a high-temperature-side solar heat collector for collecting solar heat;

a high-temperature-side heat exchanger for heating the hot water in the hot-water tank by using high-temperature heat energy collected by the high-temperature-side solar heat collector, thereby producing high-temperature steam;

a high-temperature-side heat load unit for consuming the heat energy of the high-temperature steam produced by the high-temperature-side heat exchanger, the low-temperature steam and/or hot water deprived of its heat energy by the high-temperature-side heat load unit being returned to the hot-water tank;

a first pipe connecting said hot-water tank and said low-temperature-side heat load unit;

a second pipe connecting said low-temperature-side heat load unit and said low-temperature-side heat exchanger;

a by-pass pipe connecting the first pipe and the second pipe; and selector valve means for selectively switching the passage of the hot water from said first pipe to the by-pass pipe.

2. The solar heat powered plant according to claim 1, which further comprises a supply tank attached to the first pipe, for temporarily storing the hot water from the hot-water tank.

3. The solar heat powered plant according to claim 1, which further comprises a return tank attached to the second pipe, for temporarily storing the water from the low-temperature-side heat load unit.

4. The solar heat powered plant according to claim 1, which further comprises a supply tank attached to the first pipe, for temporarily storing the hot water from the hot-water tank, and a return tank attached to the second pipe, for temporarily storing the water from the low-temperature-side heat load unit.

5. The solar heat powered plant according to claim 1, wherein said selector valve means includes a first valve attached to the first pipe, which is capable of controlling the circulation of the hot water from the hot-water tank to the low-temperature-side heat load unit; and a second valve attached to the by-pass pipe, which is capable of controlling the circulation of the hot water from the hot-water tank to the low-temperature-side heat exchanger.

6. The solar heat powered plant according to claim 5, wherein said first and second valves are operated manually.

7. The solar heat powered plant according to claim 5, wherein said first and second valves are each formed of a solenoid operated valve.

8. The solar heat powered plant according to claim 7, wherein said selector valve means includes a selector mechanism adapted to close the second valve when the first valve is open, and to open the second valve when the first valve is closed.

9. The solar heat powered plant according to claim 8, wherein said selector valve means includes detecting means for detecting when the temperature of the hot water in the hot-water tank has reached a desired temperature level; and wherein said selector mechanism first closes the first valve and then opens the second valve, in response to the results of detection by the detecting means.

10. The solar heat powered plant according to claim 1, wherein said selector valve means includes a three-way valve provided at the junction of the first pipe and the by-pass pipe, whereby the mode of supply of the hot water from the hot-water tank is selectively switched from supply to the low-temperature-side heat load unit, through the first pipe; and from supply to the low-temperature-side heat exchanger, through the by-pass pipe.

11. A starting method for solar heat power plant, having a low-temperature-side solar collector for collecting solar heat, a low-temperature-side heat exchanger for heating water by using low-temperature heat energy collected by the low-temperature-side solar heat collector, thereby producing hot water, a hot-water tank for storing the hot water heated by the low-temperature-side heat exchanger, a low-temperature-side heat load unit for consuming the heat energy of the hot water delivered from the hot-water tank, the water deprived of its heat energy by the low-temperature-side heat load unit being returned to the low-temperature-side heat exchanger, a high-temperature-side solar heat collector for collecting solar heat, a high-temperature-side heat exchanger for heating the hot water in the hot-water tank by using high-temperature heat energy collected by the high-temperature-side solar heat collector, thereby producing high-temperature steam, and a high temperature-side heat load unit for consuming the heat energy of the high-temperature steam produced by the high-temperature-side heat exchanger, the low-temperature steam and hot water deprived of its heat energy by the high-temperature-side heat load unit being returned to the hot-water tank, said method comprising, at the start-up of the plant, the steps of:

opening a by-pass pipe which connects the hot-water tank and the low-temperature-side heat exchanger to open the passage of the hot water from the hot-water tank to the low-temperature-side heat exchanger;

closing the passage of the hot water from the hot-water tank to the low-temperature-side heat load unit; and when the temperature of the hot water in the hot-water tank is higher than a given temperature, closing the by-pass pipe to close the passage of hot water from the hot-water tank to the low-temperature-side heat exchanger and opening the passage of hot water from the hot-water tank to the low-temperature-side heat load unit.

12. The starting method of claim 11 including the steps of:

sensing the temperature of the hot water in said hot water tank;

opening said passage of the hot water from the hot water tank to the low temperature side heat load unit upon sensing a desired temperature; and closing said by-pass pipe upon sensing said desired temperature, whereby said solar heat power plant is automatically switched from a warm-up mode to a normal operation mode.

13. The starting method of claim 11 wherein said passage of hot water from the hot water tank to the low temperature side heat load unit includes a first valve, and said by-pass pipe includes a second valve, wherein said step of opening said by-pass pipe comprises the step of opening said second valve, and said step of closing said passage of hot water from the hot water tank to the low temperature side heat load unit comprise the step of closing said first valve.

14. The starting method of claim 11 wherein a junction of said passage of hot water from the hot water to the lower side heat load unit and said by-pass pipe is provided with a 3-way valve,
wherein said steps of opening said by-pass pipe and closing said passage of hot water comprise the step of adjusting said 3-way valve for directing hot water from said hot water tank to said by-pass pipe.

* * * * *

UNITED STATES PATENT AND TRADEMARK OFFICE
CERTIFICATE OF CORRECTION

PATENT NO. : 4,569,331

DATED : February 11, 1986

INVENTOR(S) : Tatsuo Tani et al.

It is certified that error appears in the above-identified patent and that said Letters Patent is hereby corrected as shown below:

On the title page, the last Applicant's should read

-- Yasunori Matsuura --.

Item [73] should read -- Assignee: Tokyo Shibaura Denki Kabushiki Kaisha, Kawasaki, and Director-General of Agency of Industrial Science and Technology, Tokyo, Japan --.

Signed and Sealed this

Twelfth Day of August 1986

[SEAL]

Attest:

DONALD J. QUIGG

Attesting Officer

Commissioner of Patents and Trademarks